(12) United States Patent
Mitsubayashi et al.

(10) Patent No.: US 6,609,403 B2
(45) Date of Patent: Aug. 26, 2003

(54) ENDLESS METALLIC BELT AND MANUFACTURING METHOD THEREFOR

(75) Inventors: Masahiko Mitsubayashi, Nagoya (JP); Masazumi Onishi, Toyota (JP); Hideo Aihara, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/917,864

(22) Filed: Jul. 31, 2001

(65) Prior Publication Data

US 2002/0019283 A1 Feb. 14, 2002

(30) Foreign Application Priority Data

Aug. 2, 2000 (JP) ........................................ 2000-234383

(51) Int. Cl.[7] .................. B21D 31/00; F16H 7/02; B21H 8/00
(52) U.S. Cl. ....................... 72/53; 474/8; 474/260
(58) Field of Search ...................... 72/53; 474/8, 260

(56) References Cited

U.S. PATENT DOCUMENTS 2,519,590 A * 8/1950 Mitchell ..................... 474/267
4,661,089 A    4/1987 Cuypers ...................... 474/242
5,127,885 A * 7/1992 Herbert et al. .............. 474/260
6,254,503 B1 * 7/2001 Chiba et al. ................... 474/8
6,419,208 B1 * 7/2002 Baranda et al. ............. 254/390

FOREIGN PATENT DOCUMENTS

| DE | 7001755 | 8/1971 | |
| FR | 733023 | 9/1932 | |
| FR | 2386390 | * 12/1978 | ................. 72/53 |
| FR | 2 547 008 | 12/1984 | |
| JP | 59030670 | 2/1984 | |
| JP | 78740 | * 5/1984 | ................. 72/53 |
| JP | 61042402 | 2/1986 | |
| JP | 63096258 | 4/1988 | |

* cited by examiner

Primary Examiner—David Jones
(74) Attorney, Agent, or Firm—Pillsbury Winthrop LLP

(57) ABSTRACT

An endless metallic belt has at its outer peripheral surface a layer provided with a compressive residual stress by shot peening, and also has at its inner peripheral surface a layer provided with a compressive residual stress by shot peening. In a method for manufacturing the endless metallic belt, both outer and inner peripheral surfaces of the endless metallic belt are subjected to shot peening, wherein the inner peripheral surface is shot peened prior to the outer peripheral surface. The method produces an endless metallic belt having its fatigue strength improved without suffering any significant deformation.

17 Claims, 6 Drawing Sheets

ENDLESS METALLIC BELT AND MANUFACTURING METHOD THEREFOR

INCORPORATION BY REFERENCE

The disclosure of Japanese Patent Application No. 000-234383, filed Aug. 2, 2000, including the specification, drawings and abstract, is incorporated herein by reference in its entirety.

BACKGROUND OF THE INVENTION

1. Field of the invention

The invention relates to an endless metallic belt and a manufacturing method therefor. More particularly, the invention relates to reinforcement of a hoop of a CVT (Continuously Variable Transmission) belt or the like.

2. Description of the Related Art

An endless metallic belt is mounted on two rollers for traveling. When traveling on a roller, the belt is subjected to a tensile bending stress at its outer peripheral surface. When leaving the roller toward the next roller, the belt is straightened and is relieved of the tensile stress at the outer peripheral surface resulting from bending. During traveling, the outer peripheral surface of the belt is thus repeatedly subjected to the tensile stress by bending. It is therefore desired to improve fatigue strength of the belt against such repeated tensile stresses.

Japanese Patent Laid-Open Publication Nos. 61-42402 and 63-96258 propose an endless metallic belt with improved fatigue strength at its outer peripheral surface. More specifically, only the outer peripheral surface of the endless metallic belt is subjected to shot peening so as to produce a compressive residual stress at the outer peripheral surface, thereby improving the fatigue strength.

In an endless metallic belt formed from a thin plate, however, the ratio of the thickness of the layer of the induced residual stress to the plate thickness is of a considerable level. As shown in FIG. 8, a belt 6' is significantly deformed i.e., deformed into multiple small hoops as a result of shot peening. Hereinafter, such deformation will be referred to as multi-hoop deformation. This is because the circumferential radius of curvature is reduced in every part of the belt due to the relief of the compressive residual stress applied to the shot-particle ejected side i.e., the outer peripheral surface of the belt. Accordingly, shot peening of certain intensity or more cannot be applied to the endless metallic belt formed from a thin plate i.e., shot peening can be conducted only to such a degree that does not cause multi-hoop deformation, hindering sufficient improvement in fatigue strength.

SUMMARY OF THE INVENTION

It is an aspect of the invention to provide an endless metallic belt having improved fatigue strength without suffering any significant deformation, and a manufacturing method therefor.

In order to achieve these aspects, an endless metallic belt is provided which has at its outer peripheral surface a layer provided with a compressive residual stress by shot peening, and also has at its inner peripheral surface a layer provided with a compressive residual stress by shot peening. This endless metallic belt is produced by a manufacturing method in which both outer and inner peripheral surfaces of the endless metallic belt are subjected to shot peening. For example, with the endless metallic belt being mounted on at least two rollers, the inner peripheral surface is shot peened during traveling of the endless metallic belt, and then the endless metallic belt is reversed and the outer peripheral surface is subsequently shot peened during traveling of the endless metallic belt.

In the aforementioned endless metallic belt and manufacturing method therefor, both inner and outer peripheral surfaces of the endless metallic belt are subjected to shot peening. Therefore, a layer of compressive residual stress is formed by the shot peening both at the inner and outer peripheral surfaces of the endless metallic belt. Thus, deformation of the belt resulting from relief of the compressive residual stress at the inner peripheral surface cancels deformation of the belt resulting from relief of the compressive residual stress at the outer peripheral surface, preventing significant deformation (multi-hoop deformation) of the endless metallic belt. As a result, high-level shot peening as well as a compressive residual stress produced thereby can be applied to the outer peripheral surface of the belt, whereby the fatigue strength at the outer peripheral surface of the belt can be improved over the conventional examples.

BRIEF DESCRIPTION OF THE DRAWINGS

The above and other aspects of the invention will be better understood by reference to the following detailed description of exemplary embodiments of the invention, when considered in connection with the accompanying drawings, in which.

DESCRIPTION OF EXEMPLARY EMBODIMENTS

Figure 1:
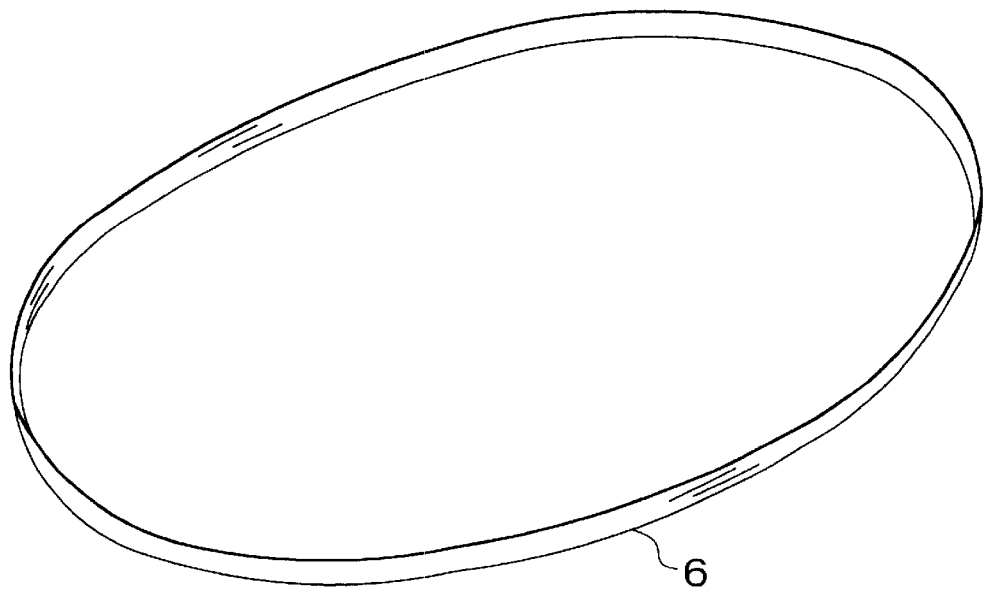
FIG. 1 is a perspective view of an exemplary embodiment of an endless metallic belt according to the invention produced by an exemplary manufacturing method according to the invention.

In the following description and the accompanying drawings, the present invention will be described in more detail in terms of various exemplary embodiments.

Hereinafter, various exemplary embodiments of an endless metallic belt and various exemplary embodiments of a manufacturing method therefor according to the invention will be described with reference to FIGS. 1 to 7. Note that, throughout the various exemplary embodiments of the invention, the same or corresponding elements are denoted with the same reference numerals and characters.

Shot peening used in the various exemplary embodiments of the invention includes, but is not limited to, shot peening conducted with a preload (pre-stress) being applied to a belt 6, i.e., stress peening.

Principles of the stress peening will now be described with reference to FIGS. 3 and 4. When reaching the rollers 1, 2 and 3, the belt 6 is bent, so that a preload A of tensile bending stress is applied to the outer periphery of the bent portion while a preload of compressive bending stress is applied to the inner periphery of the bent portion. The shot peening is conducted in this state. Shot particles 7 are ejected onto the portion of the belt 6 subjected to the preload of tensile bending stress. In FIG. 4, V is an ejection velocity, and eV is a rebound velocity. Bombardment with the shot particles 7 causes extension of the surface of the belt 6, producing a compressive residual stress B in the surface portion. As the belt 6 leaves the roller 1, 2, 3 and travels straight toward the next roller, the preload of the tensile bending stress is relieved, producing together with the tensile preload A a compressive residual stress C at the belt surface (A+B=C). In other words, the stress peening produces a compressive residual stress that is larger by the tensile preload A than that of shot peening without pre-stressing. This is advantageous in terms of improvement in fatigue strength.

Hereinafter, an endless metallic belt 6 and a manufacturing method therefor according to a first exemplary embodiment of the invention will be described.

Figure 2:
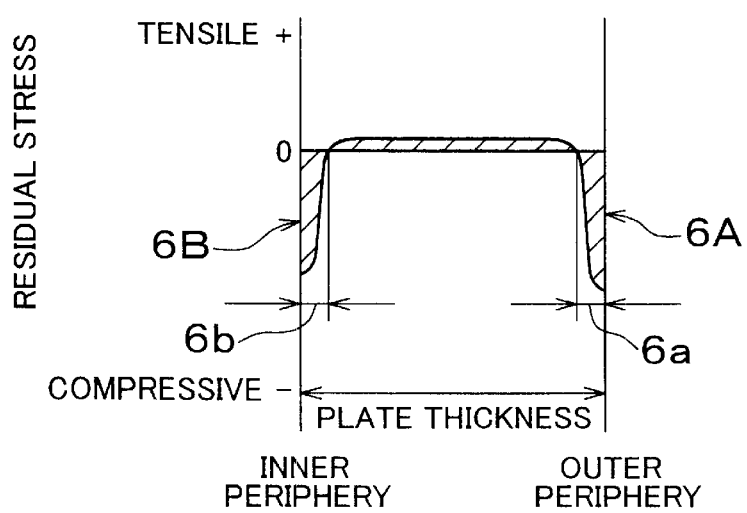
FIG. 2 is a diagram illustrating stress distribution in the plate-thickness direction after the inner and outer peripheries of the endless metallic belt of the invention are bombarded with shot particles.

As shown in FIGS. 1 and 2, the endless metallic belt 6 has layers 6a and 6b having compressive residual stress resulting from the shot peening at its outer and inner peripheral surfaces 6A and 6B, respectively. The endless metallic belt 6 is formed from a single looped metallic belt with its starting end and terminal end being bonded by welding or the like. Although stress peening is desirable as shot peening, shot peening without pre-stressing may alternatively be used.

Figure 3:
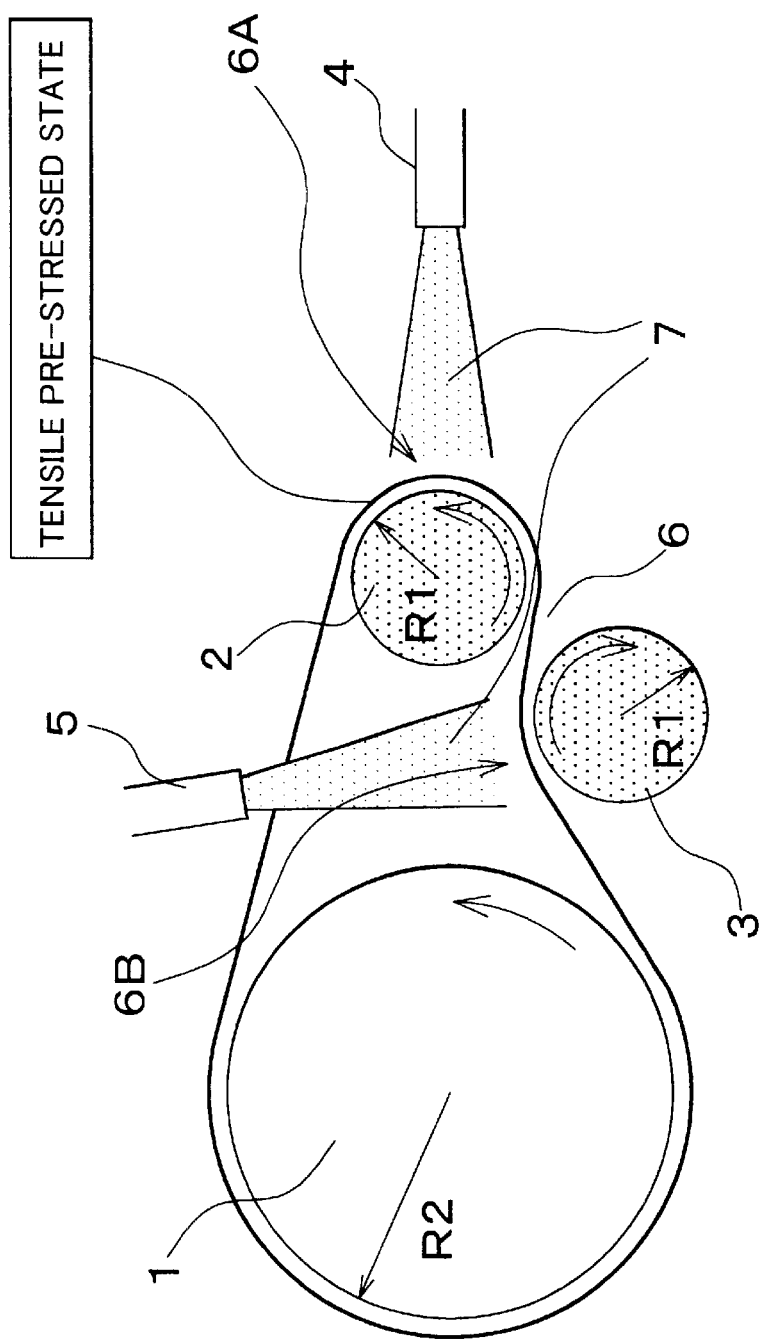
FIG. 3 is a side view schematically illustrating a manufacturing method of the endless metallic belt according to the invention.
Figure 4:
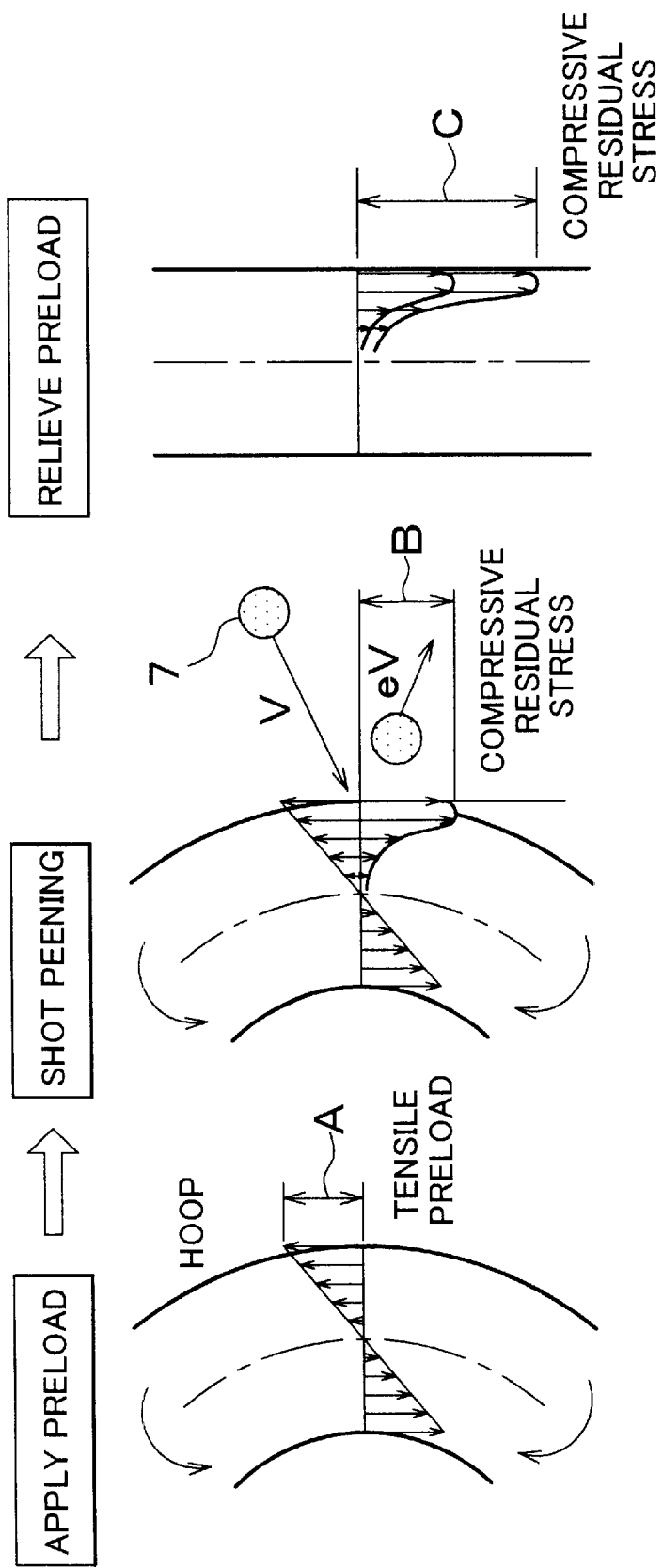
FIG. 4 is a diagram illustrating stress distribution in the plate-thickness direction in each step of an exemplary manufacturing method according to the invention.
Figure 5:
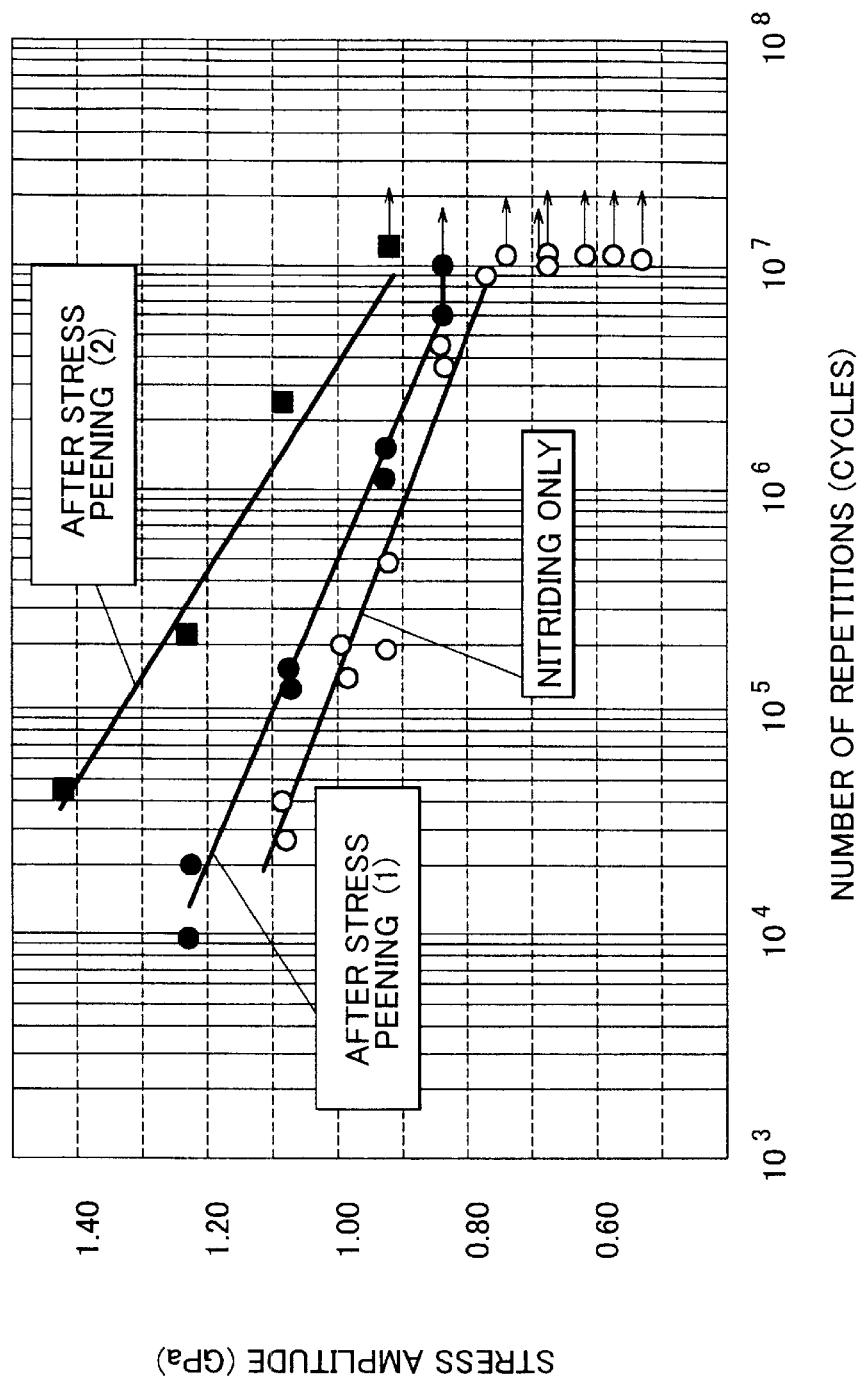
FIG. 5 is a diagram illustrating stress amplitude versus number of repetitions (S-N diagram) of an exemplary belt according to the invention subjected to stress peening at its inner and outer peripheral surfaces, a belt subjected only to nitriding, and a belt subjected to shot peening only at its outer peripheral surface.

As shown in FIGS. 3 and 4, the manufacturing method of the endless metallic belt 6 (hereinafter, sometimes simply referred to as belt 6) is a shot peening method in which the shot particles 7 are ejected from ejection nozzles 4 and 5 onto both the outer and inner peripheral surfaces 6A and 6B of the belt 6. Although stress peening is desirable as shot peening, shot peening without pre-stressing may alternatively be used. As shown in FIG. 3, in the stress peening, the endless metallic belt 6 is shot peened at the surface portions pre-stressed with the bending stress (the portions on the rollers 1, 2, 3).

The effects obtained by shot peening of both inner and outer peripheries will now be described. Conventionally, only the outer peripheral surface of a sheet metal is shot peened, causing the multi-hoop deformation as described above. Therefore, intense shot peening cannot be used. In the various exemplary embodiments according to the invention, however, both the outer and inner peripheral surfaces 6A and 6B are shot peened, thereby producing compressive residual stresses at the inner and outer peripheral surfaces. Therefore, when the stresses are relieved, deformation resulting from the compressive residual stress at the inner peripheral surface cancels deformation resulting from the compressive residual stress at the outer peripheral surface, suppressing multi-hoop deformation of the belt 6. Accordingly, much more powerful shot peening can be applied to the outer peripheral surface 6A as compared to the conventional examples, enabling a higher level of compressive residual stress to be applied to the outer peripheral surface 6A without causing significant deformation (multi-hoop deformation) of the belt 6. Thus, significant improvement in fatigue strength can be achieved.

The endless metallic belt 6 used in the first embodiment is formed from a maraging steel plate with a thickness of about 0.2 mm, a width of about 12 mm and a circumference of about 720 mm. The endless metallic belt 6 was nitrided at its surface prior to the shot peening. The nitrided layer was about 25 μm in thickness. In order to inspect the effects obtained by bombarding the inner and outer peripheral surfaces 6B and 6A of the endless metallic belt 6 with shot particles 7, the endless metallic belt 6 was processed under the following two conditions: (1) shot particles were ejected only onto the outer periphery, wherein the preload radius of curvature R was 20 mm, ejection air pressure was 0.3 MPa, ejection time was 36 seconds, shot particle size was Φ70 μm, shot particle hardness was HV700, and revolution speed of the driving shaft was 20 rpm; and (2) shot particles were ejected onto both inner and outer peripheries under the same conditions as those of (1).

Figure 8:
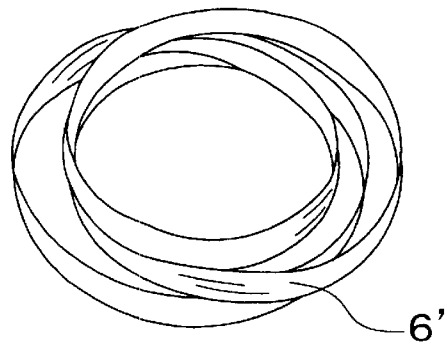
FIG. 8 is a perspective view of a belt resulting from a conventional process (in which only the outer peripheral surface is subjected to shot peening).

When only the outer peripheral suface 6A was bombarded with shot particles 7 the endless metallic belt 6' was not able to maintain its original shape, resulting in multi-hoop deformation, as shown in FIG. 8. The maximum possible levels for the belt to maintain its original shape after conventional shot peening of the outer peripheral surface only were as follows: the preload radius of curvature R of 40 mm; ejection air pressure of 0.1 MPa; ejection time of 36 seconds; shot particle size of Φ70 μm; shot particle hardness of HV700; revolution speed of the driving shaft of 20 rpm; and compressive residual stress of 1.3 GPa. The fatigue strength was improved by only about 5% over the original nitrided belt. The result is shown by (1) in FIG. 5.

In contrast, as shown in FIG. 1, the belt 6 of the first exemplary embodiment maintains its original shape (i.e., is not deformed into multiple hoops) after the inner and outer peripheral surfaces 6B and 6A were bombarded with shot particles 7. The compressive residual stress at the surface reached 1.8 GPa according to the X-ray stress measurement. As shown by (2) in FIG. 5, after one million cycles, the fatigue strength was improved by about 20% over the original nitrided belt.

Hereinafter, a manufacturing method of an endless metallic belt according to a second exemplary embodiment will be described. The endless metallic belt 6 is mounted on at least two rollers, and shot peened at its inner peripheral surface during traveling. Then, the endless metallic belt 6 is reversed, and shot peened at its outer peripheral surface during traveling.

In the present embodiment, the inner and outer peripheral surfaces are sequentially processed in this order. In this case, the outer peripheral surface 6A is processed after the endless metallic belt 6 is reversed. The first embodiment includes the following cases: (a) the inner peripheral surface 6B is processed before the outer peripheral surface 6A; (b) the inner and outer peripheral surfaces 6B and 6A are simultaneously processed; and (c) the outer peripheral surface 6A is processed before the inner peripheral surface 6B. The second embodiment corresponds to the case (a) where the inner peripheral surface is processed before the outer peripheral surface.

The effects of the second embodiment will now be described. Since the inner peripheral surface is processed before the outer peripheral surface, the second embodiment is more advantageous in terms of the fatigue strength than the cases (b) where the inner and outer peripheral surface are simultaneously processed and (c) where the outer peripheral surface is processed before the inner peripheral surface.

The reason for this is considered as follows: the compressive residual stress level at the outer peripheral surface 6A, which directly affects the strength, varies depending on the processing order. More specifically, the compressive residual stress level resulting from processing the outer peripheral surface 6A later is higher than that obtained in the other cases, thereby improving the fatigue strength.

The reason why such a higher compressive residual stress is obtained is estimated as follows: it is now assumed that a thin plate is subjected to shot peening. A metal plate (belt) is extended in the planar direction (the direction vertical to the plate thickness) as a result of shot peening. Therefore, if two sides of the metal plate (the inner and outer peripheral surfaces of the belt) are shot peened at different timings, the metal plate is extended in the planar direction by the subsequent shot peening so as to relieve the compressive residual stress applied by the previous shot peening. Thus, the final stress balance varies depending on the processing order.

If the outer peripheral surface 6A is shot peened first, extension of the sheet metal produced by shot peening of the inner peripheral surface 6B relieves the stress at the outer peripheral surface 6A. As a result, the compressive residual stress level at the outer peripheral surface 6A is reduced. In the second embodiment, however, the inner peripheral surface 6B is shot peened first. Therefore, the inner peripheral surface 6B has a lower stress value, whereas the outer peripheral surface 6A has a higher stress value, resulting in improvement in fatigue strength.

Figure 6:
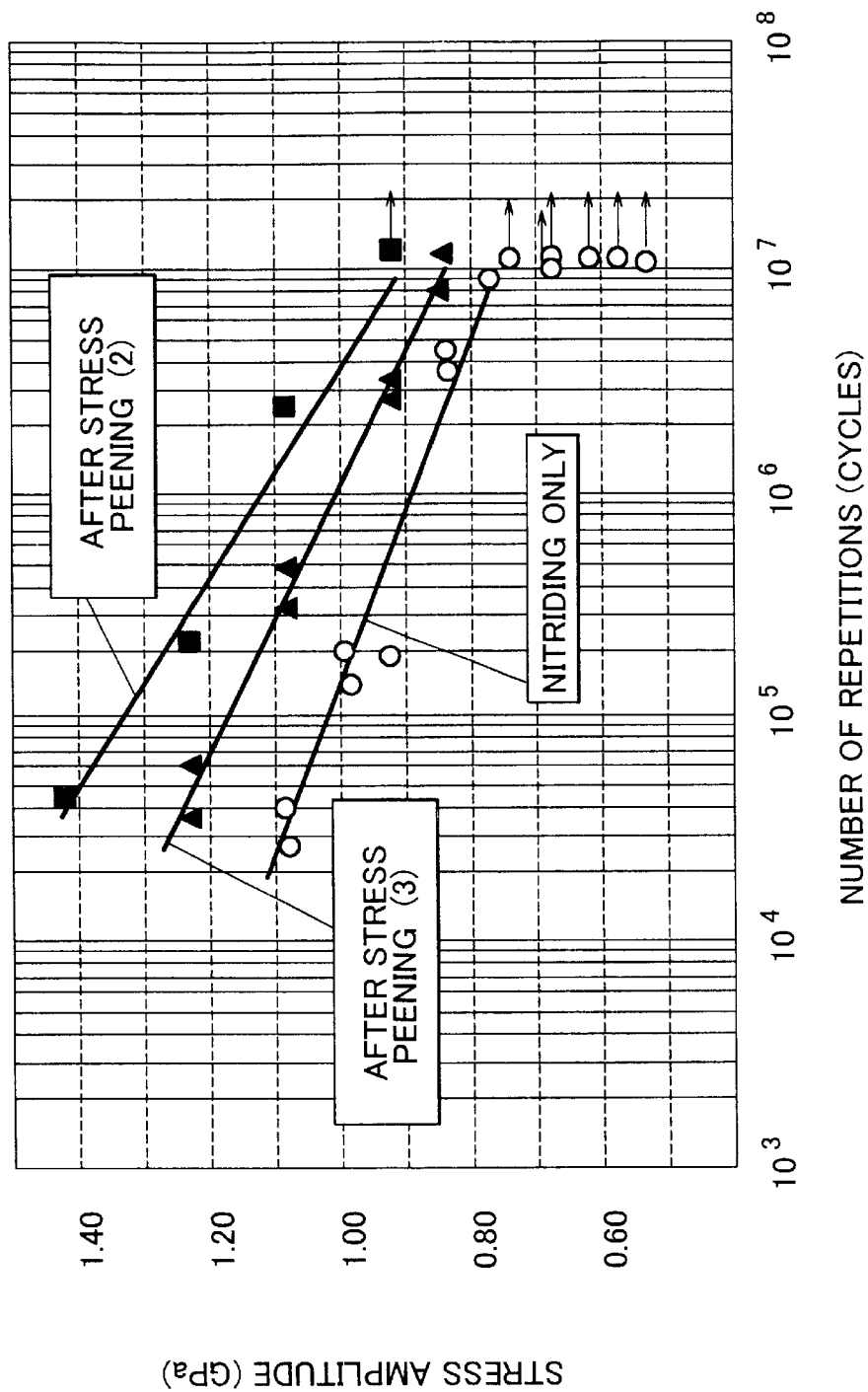
FIG. 6 is a diagram illustrating stress amplitude versus number of repetitions (S-N diagram) of a belt subjected to shot peening sequentially at its inner and outer peripheral surfaces, and a belt subjected to shot peening sequentially at its outer and inner peripheral surfaces.

For comparison of the fatigue strength, the same endless metallic belt as that described in the first embodiment was shot peened in the following two orders: (2) the inner peripheral surface was processed before the outer peripheral surface; and (3) the outer peripheral surface was processed before the inner peripheral surface ((3) is not included in the second embodiment, but included in the first embodiment). The results are shown in FIG. 6. After one million cycles, the strength (shown by the ordinate in FIG. 6) was improved over the original nitrided belt by about 11% in (3), but by about 20% in (2). The measured residual stress at the outer peripheral surface 6A, which greatly affects the strength, was 1.5 GPa in (3), but reached 1.8 GPa in (2). Thus, it was confirmed that the compressive residual stress level varies depending on the processing order.

Hereinafter, a manufacturing method for an endless metallic belt according to a third exemplary embodiment will be described. As shown in FIG. 3, in the manufacturing method of the third embodiment, the endless metallic belt 6 is mounted on at least two rollers 1, 2, so that the inner and outer peripheral surfaces 6B and 6A therefor are shot peened during traveling without reversing the endless metallic belt 6.

In the case where the belt 6 is reversed as in the second embodiment, the reversing step is required, resulting in a two-step shot-peening process. In the third embodiment, however, the belt 6 is shot peened without reversing the belt 6, as shown in FIG. 3. In order to obtain the effects of the stress peening in the processing of the inner peripheral surface 6B, the roller 3 is pressed against the outer peripheral surface 6A at a position corresponding to the processing portion of the inner peripheral surface 6B. Thus, a circumferential curvature is applied in the opposite direction to that applied by the rollers 1 and 2, and a tensile stress is produced at the inner peripheral surface 6B. The inner peripheral surface 6B is processed in this state. As described above, the term "stress peening" as used herein is a process in which the shot peening is conducted with the surface being pre-stressed by a tensile stress, so that the pre-stress, when relieved, is additionally applied as compressive residual stress. In other words, since the shot peening is conducted with the inner peripheral surface 6B of the belt 6 being subjected to the tensile stress, this pre-stress, when relieved, can be additionally applied as compressive residual stress.

In the third embodiment of the invention, the same belt 6 as that described in the first embodiment was used, and the inner and outer peripheral surfaces 6B and 6A thereof were stress peened in the same step by using the apparatus of FIG. 3. Both inner and outer peripheral surfaces 6B and 6A were processed under the following conditions: preload radius of curvature R1 of 20 mm; ejection air pressure of 0.3 MPa; ejection time of 36 seconds; shot particle size of $\Phi 70\ \mu m$; shot particle hardness of HV700; and revolution speed of the driving shaft of 20 rpm. The processing of the inner and outer peripheral surfaces 6B and 6A was started simultaneously and also terminated simultaneously after several rotations of the belt 6.

The cycle time required to process a single belt (the cycle time to mount, process and remove the belt) is about 120 seconds in the second embodiment including the time to reverse the belt as well as to mount and remove the belt, but is about 55 seconds in the third embodiment, achieving significant time reduction. The resultant strength of the belt of the third embodiment is approximately the same as that of the second embodiment shown by (2) in FIG. 5. Therefore, the strength is improved by about 18%.

Hereinafter, a manufacturing method of an endless metallic belt according to a fourth exemplary embodiment will be described. In this embodiment, shot particles are ejected onto the inner and outer peripheral surfaces 6B and 6A in the same order throughout the endless metallic belt 6. In other words, the shot particles 7 are first ejected onto the inner peripheral surface 6B of the endless metallic belt.

In the third embodiment, even if the ejection nozzles 4 and 5 eject the shot particles 7 at the same timing, the shot particles 7 are first ejected onto the inner peripheral surface 6B in some part of the belt 6, but are first ejected onto the outer peripheral surface 6A in the other part. In other words, the processing order varies depending on the circumferential positions of the belt 6. As described in the second embodiment, the processing order affects the compressive residual stress, and thus affects the accuracy in shape of the belt determined by the compressive residual stress. In applications of the metallic belt 6, crowning (widthwise curving) accuracy of the axial cross section is often required, for example like in the hoop of a CVT belt, and in particular, it is desired that variation of the crowning depending on the circumferential positions be as small as possible.

In the fourth embodiment, every part of the belt 6 is shot peened in the same order regardless of the circumferential position. More specifically, processing of the inner peripheral surface 6B is started first. Then, processing of the outer peripheral surface 6A is started when the processed portion of the belt is rotated (travels) to the position for processing the outer peripheral surface. According to this method, every part of the belt 6 is processed in the same order, resulting in uniform shape accuracy.

In the fourth embodiment of the invention, the same belt 6 as that described in the first embodiment was used, and the inner and outer peripheral surfaces 6B and 6A thereof were stress peened in the same step by using the apparatuses shown in FIG. 3. Both inner and outer peripheral surfaces 6B and 6A were processed under the following conditions: preload radius of curvature R of 20 mm; ejection air pressure of 0.3 MPa; ejection time of 36 seconds; shot particle size of $\Phi 70\,\mu m$; shot particle hardness of HV700; and revolution speed of the driving shaft of 20 rpm. Processing of the outer peripheral surface 6A starts about two seconds after processing of the inner peripheral surface 6B starts.

Figure 7:
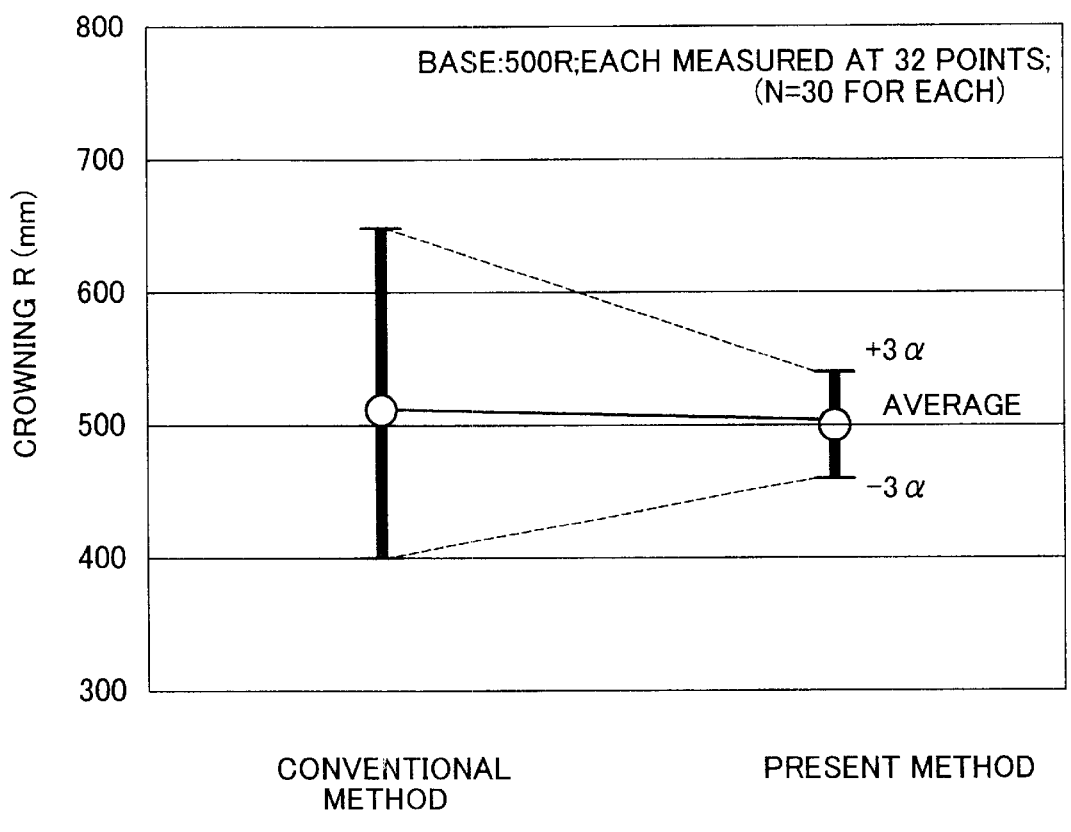
FIG. 7 is a diagram illustrating a crowning comparison between an exemplary method according to the invention and the method of the related art.

Regarding 30 belts produced by the conventional method and 30 belts produced by the method of the fourth embodiment, the crowning R was measured at 32 positions of the belt 6, and variation in crowning R within a single belt was compared using a standard deviation of the measured values. result is shown in FIG. 7. Variation in crowning R in the entire circumference of the belt was significantly suppressed, and the variation range (standard deviation) was reduced by about 50%.

Hereinafter, a manufacturing method of an endless metallic belt according to a fifth exemplary embodiment will be described. As shown in FIG. 3, in the manufacturing method of the fifth embodiment, shot particles 7 are ejected onto the outer peripheral surface 6A of the endless metallic belt 6 longer than the inner peripheral surface 6B so that the outer peripheral surface 6A is finally shot peened in every part of the endless metallic belt 6.

In the case where the inner and outer peripheral surfaces 6B and 6A are processed in the same step, residual stresses are applied to the inner and outer peripheral surfaces, affecting extensions in the planar direction at the outer and inner peripheral surfaces 6A and 6B, respectively. The residual stress at the inner peripheral surface 6B plays a different role from that of the residual stress at the outer peripheral surface 6A. More specifically, the residual stress at the inner peripheral surface 6B serves to maintain the shape, whereas the residual stress at the outer peripheral surface 6A serves to improve the fatigue strength. Therefore, the respective required stress levels are different. It is desirable that the outer peripheral surface 6A that determines the fatigue strength be provided with a higher level of compressive residual stress than that of the inner peripheral surface 6B.

Therefore, processing of the inner peripheral surface 6B is terminated earlier than processing of the outer peripheral surface 6A, so that the entire outer peripheral surface 6A of the belt 6 is processed alone. Thus, a residual stress is applied to the outer peripheral surface 6A without being affected by the processing of the inner peripheral surface 6B. This enables the outer peripheral surface 6A to have a relatively high stress level as compared to the case where the processing of the inner and outer peripheral surfaces 6B and 6A is terminated simultaneously. As a result, the improvement in strength and the shape accuracy can be balanced at a high level.

In the fifth embodiment, the same belt 6 as that of the fourth embodiment was used, and the shot peening was conducted under the same conditions as those of the fourth embodiment except for the ejection time. The ejection time was 27 seconds for the inner peripheral surface 6B and 36 seconds for the outer peripheral surface 6A so that the outer peripheral surface 6A was finally shot peened in every part of the belt. Thus, the residual stress of 1.8 GPa was able to be ensured on the entire outer peripheral surface, and the fatigue strength was improved by about 20%. Accordingly, the same reinforcement characteristic as that of the first embodiment was able to be obtained with the same cycle time of 55 seconds as that of the third embodiment, whereby the processing capability and processing quality (strength, accuracy) can be balanced at a high level.

Hereinafter, a manufacturing method of an endless metallic belt of a sixth exemplary embodiment will be described. As shown in FIG. 3, in the manufacturing method of the sixth embodiment, the endless metallic belt 6 is mounted on at least three rollers 1, 2 and 3 including a first roller 3 for applying a tensile pre-stress (preload) to the inner peripheral surface 6B of the endless metallic belt 6 and a second roller 2 for applying a tensile pre-stress (preload) to the outer peripheral surface 6A of the endless metallic belt 6. Shot particles 7 are ejected from the ejection nozzle 5 onto the portion of the inner peripheral surface 6B located on the first roller 3. Shot particles 7 are also ejected from the ejection nozzle 4 onto the portion of the outer peripheral surface 6A located on the second roller 2. The belt 6 is subjected to preload curvatures of the opposite directions at the respective processing positions of the inner and outer peripheral surfaces 6B and 6A. The timing of ejecting the shot particles 7 from the respective ejection nozzles 4 and 5 onto the inner and outer peripheral surfaces can be controlled independently of each other.

FIG. 3 shows an exemplary structure of the shot peening apparatus. This apparatus includes three rollers, wherein the roller 1 is a driving roller, and the rollers 2 and 3 are driven rollers. The shot peening apparatus also includes two ejection nozzles 4 and 5. The main nozzle 4 ejects the shot particles 7 onto the outer peripheral surface 6A, whereas the sub nozzle 5 ejects the shot particles 7 onto the inner peripheral surface 6B. The sub nozzle 5 ejects the shot particles 7 at about 30° above or below the horizontal plane in order to prevent interference with the belt 6 at the position facing the target position in the circumferential direction. This angle increases an effective component of the ejection velocity V. Therefore, it is desirable that the angle be as small as possible within the range that does not cause any interference with the belt 6. However, the angle need not be specifically defined if a facility having a margin of ejection velocity is used.

A spring may be used to apply tension to the belt 6. This tension is applied in order to obtain frictional force that allows the belt 6 to be rotated without slipping. Therefore, this tension is small enough as compared to the tensile preload produced at the ring surface by the curvature of the roller. The driving roller 1 is driven with a servomotor, and the revolution speed thereof can be controlled up to 60 rpm. The revolution speed and rotation angle are synchronized with the timing of starting and terminating ejection from the main and sub nozzles 4, 5. A shot-particle ejecting mechanism used herein is of a normal direct-pressure air-blow type. However, any type of mechanism such as ventilation air-blow type or impeller type may be used.

The effects of the sixth embodiment of the invention will now be described. The shot particles 7 can be ejected onto the inner and outer peripheral surfaces 6B and 6A of the belt 6 with tensile bending pre-stresses being applied to the inner and outer peripheries at different positions by the apparatus having at least three rollers 1, 2 and 3. Thus, the inner and outer peripheral surfaces 6B and 6A of the belt 6 can be continuously and efficiently shot peened without reversing the belt 6.

According to the endless metallic belt and the manufacturing method thereof described in each of the above exemplary embodiments, both the inner and outer peripheral surfaces 6B and 6A of the endless metallic belt 6 are subjected to shot peening. Therefore, a compressive residual stress layer is formed at both inner and outer peripheral surfaces 6B and 6A of the endless metallic belt 6 as a result of the shot peening, preventing significant deformation (multi-hoop deformation) of the endless metallic belt. As a result, the outer peripheral surface 6A of the belt 6 can be subjected to high-level shot peening and a compressive residual stress produced thereby, enabling improvement in fatigue strength at the outer peripheral surface of the belt over the conventional examples.

In the case where the inner and outer peripheral surfaces 6B and 6A of the belt 6 are sequentially subjected to shot peening in this order with the belt being reversed before the outer peripheral surface 6A is shot peened, a compressive residual stress level at the outer peripheral surface 6A is increased as compared to the case where the shot peening is conducted in the opposite order. This is advantageous in terms of improvement in fatigue strength.

Moreover, the step of reversing the endless metallic belt 6 as well as the steps of mounting and removing the belt 6 to and from the rollers can be omitted. This enables reduction in processing time for improving fatigue strength of the belt 6, as compared to the case where the belt 6 is reversed. Furthermore, in the case where the shot particles 7 are ejected onto both sides of the belt 6 in the same order in every part of the belt 6, variation in shape accuracy within the belt 6 can be suppressed.

In the case where the shot particles 7 are first ejected onto the inner peripheral surface 6B of the endless metallic belt 6, a high-level compressive residual stress can be applied to the outer peripheral surface 6A.

Moreover, in the case where the shot particles 7 are finally ejected onto the outer peripheral surface 6A in every part of the endless metallic belt 6, a residual stress can be applied to the outer peripheral surface 6A almost without being affected by shot peening of the inner peripheral surface 6B.

In the case where the shot particles 7 are ejected onto the inner and outer peripheral surfaces 6B and 6A of the belt 6 with tensile bending pre-stresses being applied to the inner and outer peripharal sufaces 6B and 6A at different positions by the apparatus having at least three rollers, the inner and outer peripheral surfaces 6B and 6A of the belt 6 can be efficiently shot peened.

While the invention has been described with reference to various exemplary embodiments thereof, it is to be understood that the invention is not limited to the preferred embodiments or constructions. To the contrary, the invention is intended to cover various modifications and equivalent arrangements. In addition, while the various elements of the various exemplary embodiments are shown in various combinations and configurations, other combinations and configurations, including more, less or only a single element, are also within the sprit and scope of the invention.

What is claimed is:

1. A method for manufacturing an endless metallic belt, comprising:
   shot peening an inner peripheral surface of the endless metallic belt with the endless metallic belt being mounted on the at least two rollers; and
   shot peening an outer peripheral surface of the endless metallic belt with the endless metallic belt being mounted on the at least two rollers.

2. The method according to claim 1, wherein the inner peripheral surface is shot peened during traveling of the endless metallic belt, the endless metallic belt is reversed, and the outer peripheral surface is subsequently shot peened during traveling of the endless metallic belt.

3. The method according to claim 1, wherein the inner and outer peripheral surfaces are shot peened during traveling of the endless metallic belt without reversing the endless metallic belt.

4. The method according to claim 3, wherein shot particles are ejected onto the outer peripheral surface longer than the inner peripheral surface.

5. The method according to claim 4, wherein the endless metallic belt is mounted around at least three rollers including a first roller that applies a tensile pre-stress to the inner peripheral surface of the endless metallic belt and a second roller that applies a tensile pre-stress to the outer peripheral surface thereof, and the shot particles are ejected onto a portion of the inner peripheral surface located on the first roller and onto a portion of the outer peripheral surface located on the second roller.

6. The method according to claim 3, wherein the endless metallic belt is mounted around at least three rollers including a first roller that applies a tensile pre-stress to the inner peripheral surface of the endless metallic belt and a second roller that applies a tensile pre-stress to the outer peripheral surface thereof, and the shot particles are ejected onto a portion of the inner peripheral surface located on the first roller and onto a portion of the outer peripheral surface located on the second roller.

7. The method according to claim 3, wherein the outer and inner peripheral surfaces are shot peened after the endless metallic belt is nitrided.

8. The method according to claim 3, wherein shot particles are ejected onto the inner and outer peripheral surfaces in a same order on every part of the endless metallic belt.

9. The method according to claim 8, wherein the shot particles are ejected onto the outer peripheral surface longer than the inner peripheral surface.

10. The method according to claim 9, wherein the endless metallic belt is mounted on at least three rollers including a first roller that applies a tensile pre-stress to the inner peripheral surface of the endless metallic belt and a second roller that applies a tensile pre-stress to the outer peripheral surface thereof, and the shot particles are ejected onto a portion of the inner peripheral surface located on the first roller and onto a portion of the outer peripheral surface located on the second roller.

11. The method according to claim 8, wherein the endless metallic belt is mounted around at least three rollers including a first roller that applies a tensile pre-stress to the inner peripheral surface of the endless metallic belt and a second roller that applies a tensile pre-stress to the outer peripheral surface thereof, and the shot particles are ejected onto a portion of the inner peripheral surface located on the first roller and onto a portion of the outer peripheral surface located on the second roller.

12. The method according to claim 8, wherein shot particles are first ejected onto the inner peripheral surface of the endless metallic belt and shot particles are then ejected onto the outer peripheral surface on every part of the endless metallic belt.

13. The method according to claim 12, wherein the endless metallic belt is mounted on at least three rollers including a first roller that applies a tensile pre-stress to the inner peripheral surface of the endless metallic belt and a second roller that applies a tensile pre-stress to the outer peripheral surface thereof, and the shot particles are ejected onto a portion of the inner peripheral surface located on the first roller and onto a portion of the outer peripheral surface located on the second roller.

14. The method according to claim 12, wherein the shot particles are ejected onto the outer peripheral surface longer than the inner peripheral surface.

15. The method according to claim 14, wherein the endless metallic belt is mounted on at least three rollers including a first roller that applies a tensile pre-stress to the inner peripheral surface of the endless metallic belt and a second roller that applies a tensile pre-stress to the outer peripheral surface thereof, and the shot particles are ejected onto a portion of the inner peripheral surface located on the first roller and onto a portion of the outer peripheral surface located on the second roller.

16. The method according to claim 1, wherein the outer and inner peripheral surfaces are shot peened after the endless metallic belt is nitrided.

17. An apparatus for manufacturing an endless metallic belt, comprising:

a first roller that applies a tensile pre-stress to an inner peripheral surface of the belt;

a second roller that applies a tensile pre-stress to an outer peripheral surface of the belt;

a first shot particle ejection nozzle that ejects shot particles onto a portion of the belt that is pre-stressed by the first roller; and a second shot particle ejection nozzle that ejects shot particles onto a portion of the belt that is pre-stressed by the second roller.

* * * * *